United States Patent
Bach

[11] 3,751,912
[45] Aug. 14, 1973

[54] HYBRID BRAKE BOOSTER USING CHARGING VALVE

[75] Inventor: Lloyd G. Bach, South Bend, Ind.

[73] Assignee: The Bendix Corporation, South Bend, Ind.

[22] Filed: Feb. 10, 1972

[21] Appl. No.: 225,166

Related U.S. Application Data
[63] Continuation-in-part of Ser. No. 172,803, Aug. 18, 1971.

[52] U.S. Cl. ............... 60/54.5 P, 91/391 R, 60/413
[51] Int. Cl. ............... F15b 7/00, F15b 13/10, F03c
[58] Field of Search .................. 60/54.5 P, 54.6 P, 60/52 B, 51, 413; 91/391 R; 137/115

[56] References Cited
UNITED STATES PATENTS

| | | | |
|---|---|---|---|
| 3,633,363 | 1/1972 | Larsen | 60/54.6 P |
| 3,692,039 | 9/1972 | Ewald et al. | 137/115 |
| 3,610,102 | 10/1971 | Brown | 91/391 |
| 3,575,192 | 4/1971 | McDuff | 137/118 |
| 3,677,007 | 7/1972 | Goscenchi | 60/54.6 P |
| 3,353,451 | 11/1967 | Garrison et al. | 60/54.5 P |
| 3,638,528 | 2/1970 | Lewis | 60/51 |

Primary Examiner—Martin P. Schwadron
Assistant Examiner—A. M. Zupcic
Attorney—Ken C. Decker et al.

[57] ABSTRACT

A hydraulic brake booster is disclosed which provides a power assist to the vehicle operator when the operator applies the vehicle's brakes. The brake booster includes a first valve which restricts flow of fluid through the vehicle's hydraulic system to develop back pressure in the latter, thereby providing a source of fluid pressure which is used to operate the booster. A back-up fluid supply is provided which is stored in a conventional fluid pressure accumulator. A second valve within the booster housing is actuated when a malfunction prevents normal development of fluid pressure in the booster. When this occurs, the second valve is opened to communicate the high pressure fluid stored in the accumulator into the booster to provide the power assist. A charging valve is also provided in the vehicle's hydraulic system which is adapted to develop back pressure in the latter to communicate at least a portion of the fluid flowing through the system into the accumulator to charge the latter when the hydraulic system functions normally.

5 Claims, 2 Drawing Figures

Patented Aug. 14, 1973

HYBRID BRAKE BOOSTER USING CHARGING VALVE

BACKGROUND OF THE INVENTION

This application is a continuation-in-part of copending U.S. Pat. application Ser. No. 172,803, filed Aug. 18, 1971, owned by the assignee of the present invention and incorporated herein by reference.

Because of their smaller size, their lower weight and their ability to produce a higher output force, hydraulic brake boosters are expected to be used in lieu of existing vacuum boosters in the near future for providing a power assist to a vehicle operator when the brakes of the vehicle are applied. However, existing vacuum boosters of the so-called "vacuum-suspended" type provide a power assist for a limited number of stops even after the vehicle's engine dies. On the other hand, hydraulic brake boosters immediately revert to manual operation if a malfunction should cause the vehicle's engine to die thereby terminating operation of the power steering pump, or if the valve used within the booster to communicate fluid into the latter should malfunction. Therefore, it is desirable to provide an auxiliary fluid supply to actuate the brake booster during the aforementioned conditions when pressurized fluid cannot be communicated into the latter from the vehicle's normal hydraulic system. Such an auxiliary fluid supply arrangement is described in the above-identified patent application. However, one deficiency with most such auxiliary fluid supply systems is that the accumulator is randomly charged when normal back pressure is developed in the hydraulic system by operation of the brake booster or by operation of the vehicle's power steering gear. Since it is possible for the accumulator to become completely discharged if the brake booster or power steering gear is not operated, it is desirable to assure that the accumulator is always fully charged.

SUMMARY OF THE INVENTION

Therefore, an important object of my invention is to provide an auxiliary fluid supply for a hydraulic brake booster in which the fluid charge in the latter is maintained at the proper level at all times while the hydraulic system functions normally.

Another important object of my invention is to provide a hydraulic brake booster of the open center or flow-through type in which a charging valve is also provided in the hydraulic system to charge a pressure accumulator.

Still another important object of my invention is to permit fluid from the vehicle's primary hydraulic system to immediately be communicated into the booster pressure chamber should the primary hydraulic system resume normal operation after a brake application is initiated using the pressurized fluid stored in the accumulator.

DETAILED DESCRIPTION

Figure 1:
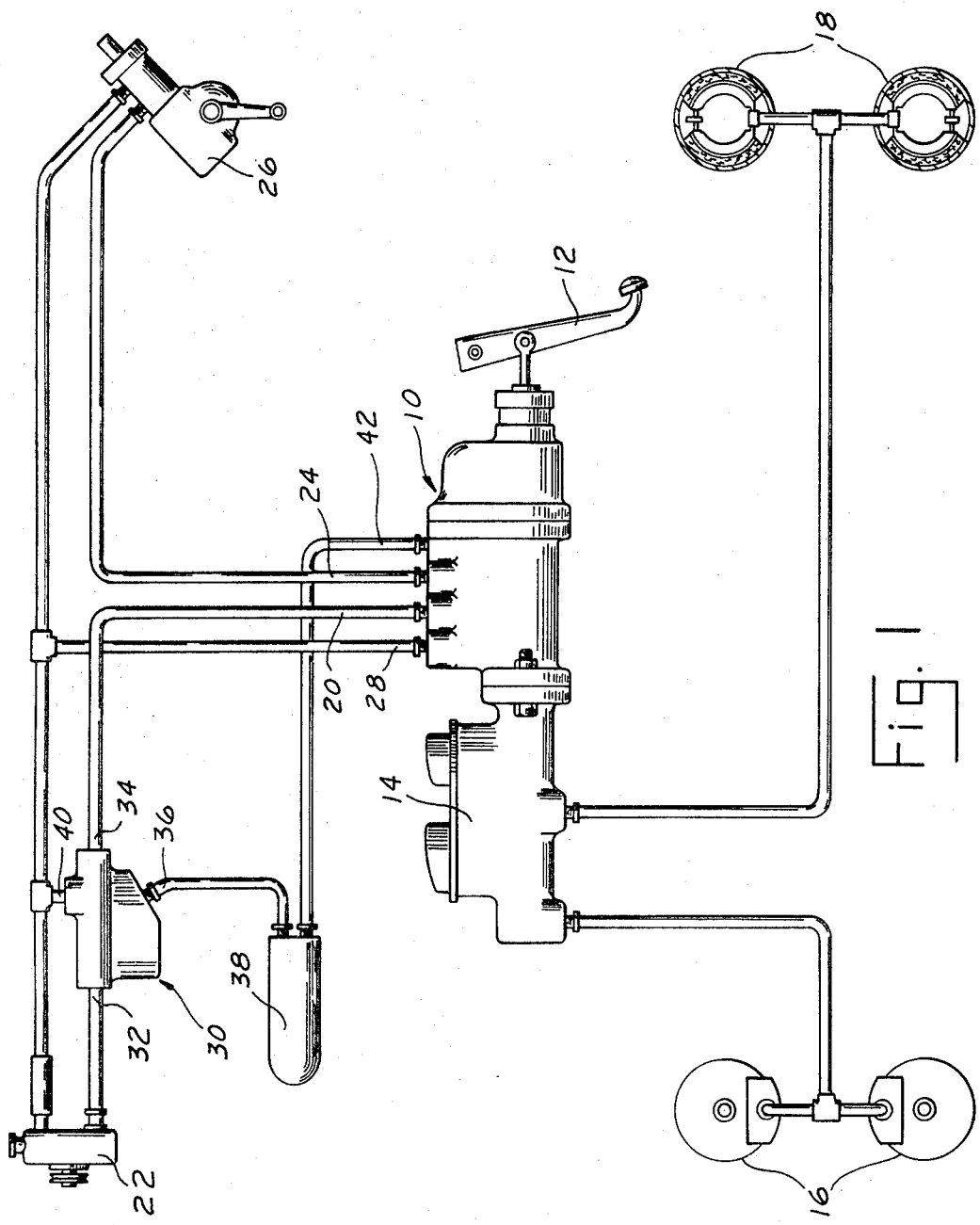
FIG. 1 is a schematic illustration of a vehicle hydraulic system made pursuant to the teachings of my present invention.

Referring now to the drawings, the hydraulic brake booster generally indicated by the numeral 10 is actuated by a conventional brake pedal 12 mounted in the vehicle operator's compartment and is adapted to actuate a conventional automotive master cylinder 14 for actuating conventional disc brakes 16 on the front wheels of the vehicle and drum brakes 18 on the rear wheels of the vehicle. The booster 10 includes an inlet port 20 which is communicated to the outlet or high pressure side of the vehicle's power steering pump 22, and an outlet port 24 which is communicated with the inlet of the vehicle's power steering gear 26. Booster 10 also includes a return or exhaust port 28 which is communicated to a reservoir (not shown) at the inlet of the pump 22, as is the outlet of the power steering gear 26. The vehicle's hydraulic system further includes a charging valve generally indicated by the numeral 30 which is preferably made according to the teachings of copending U.S. Pat. application Ser. No. 99,796, filed Dec. 21, 1970, owned by the assignee of the present invention and incorporated herein by reference. The charging valve 30 includes an inlet port 32 connected to the high pressure side of the pump 22 and first outlet port 34 connected to the inlet port 20 of the booster 10. Charging valve 30 is adapted to restrict flow between the ports 32 and 34 so that a predetermined minimum amount of flow is always communicated to the inlet port 20; however, since flow is restricted, back pressure is developed in the hydraulic system which is communicated through a second outlet port 36 to an accumulator 38 of a type well known to those skilled in the art. The charging valve 30 further has a return or exhaust port 40 which is connected to the reservoir (not shown) at the inlet of pump 22. The outlet of the accumulator 38 is connected to still another port 42 on the booster 10.

Figure 2:
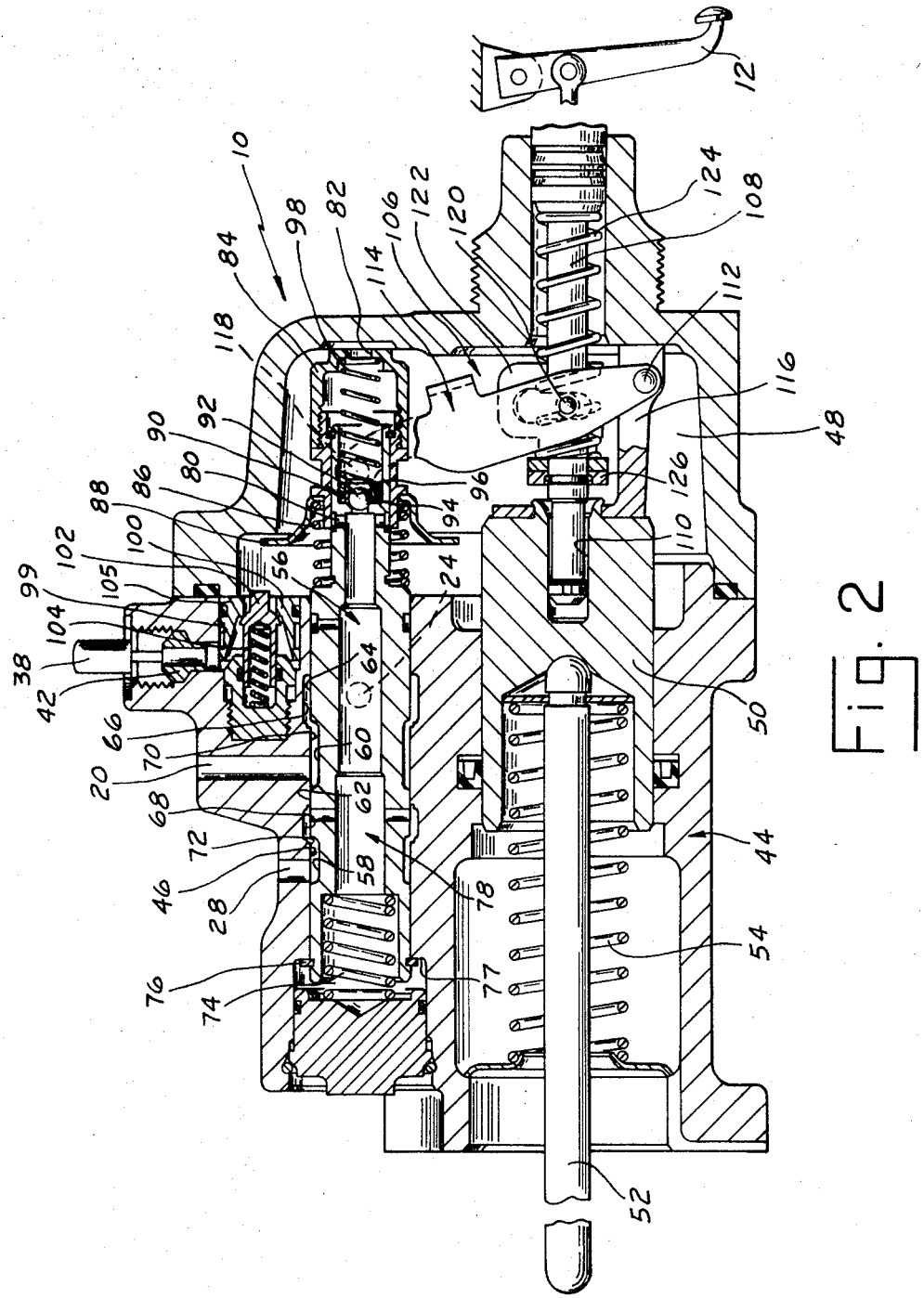
FIG. 2 is a cross-sectional view of a hydraulic brake booster used in the system illustrated in FIG. 1.

Referring now to FIG. 2, the booster 10 includes a housing 44 defining a bore 46 and a pressure chamber 48 therewithin. A boost piston 50 is slidably mounted within the housing 44 and one end of the latter is exposed to the fluid pressure level in the pressure chamber 48. An actuating rod 52 connects the piston 50 with the master cylinder 14 for actuating the latter in the conventional manner. A return spring 54 yieldably urges the piston 50 to the right viewing FIG. 2, toward the brake release position. A spool valve generally indicated by the numeral 56 is slidably mounted in the bore 46 and is provided with grooves 58 and 60 and lands 62, 64, which cooperate with corresponding grooves 66, 68 and lands 70, 72 on the wall of the bore 46. As illustrated in the drawings, the inlet port 20 communicates with the groove 60, the outlet port 24 communicates with the groove 64 and the return port 28 communicates with the groove 58. A spring 74 yieldably urges an abutment 76 carried on the left hand end of the spool valve 56 into engagement with a shoulder 77 provided on the wall of the bore 14, thereby defining the brake release position of the spool valve 56. Passage means generally indicated by the numeral 78 communicate the groove 68 with a first set of ports 80 and a second port 82, both of which normally communicate the passage means 78, and therefore the groove 68 with the pressure chamber 48.

A secondary valve member includes a sleeve 84 slidably mounted on the right hand end of the spool valve 56, which is movable into a position closing communication through the port means 80, but which is yieldably urged away from the port means 80 by a spring 86.

3

The spring 86 also retains an annular member 88 for movement with the sleeve 84, the purpose of which will be explained in detail hereinafter. A check valve generally indicated by the numeral 90 prevents communication from the chamber 48 into the passage means 78 through the port 82, but permits communication in the reverse direction. The check valve 90 includes a sphere 92 which cooperates with a valve seat 94. A porous retainer 96 is also urged against the seat 94 by a spring 98 so that only a minimum pressure differential is required to urge the sphere 92 away from the seat 94.

The port 42 communicates with a second bore 98 within the housing 44. An annular first valve member 100 is slidably mounted in the bore 98, and a second valve member 102 is slidably carried within the bore 98. A spring 104 yieldably urges the valve member 102 into sealing engagement with the valve member 100 and thereafter urges the valve members 100 and 102 as a unit toward the right viewing FIG. 2, so that the valve member 100 is urged into engagement with a shoulder 105 provided on the housing 44. The right hand end of the valve member 102 extends through the opening in the annular valve member 100, so that the valve member 102 may be engaged by the retainer 88.

The brake booster 10 is actuated by actuating means generally indicated by the numeral 106, which includes an actuating rod 108 slidably mounted within the booster housing, one end of which is connected to the brake pedal 12 and the other end of which is slidably received in a blind bore 110 defined within the piston 50. A first pivot 112 connects one end of lever means 114 to a bracket 116 carried by the piston 50, and a second pivot 118 connects the opposite end of the lever means 114 to the sleeve 84. A third pivot 120 connects a bracket 122 slidably mounted on the rod 108 to the lever means 114 at a point intermediate of the ends thereof. A spring 124 yieldably urges the member 122 into engagement with an abutment 126 provided on the rod 108.

MODE OF OPERATION

The various components of the brake booster 10 are illustrated in FIG. 2 in the positions which they assume when the brakes of the vehicle are released. In this position, communication between the grooves 60 and 68 is prevented, and substantially uninhibited communication is permitted between the grooves 60 and 64 so that substantially all of the fluid flow into the inlet port 20 is immediately communicated to the outlet port 24. The groove 68 is communicated with the groove 58, so that the pressure chamber 48 is vented to the reservoir at the low pressure side of the pump 22 through the port means 80, the passage means 78, the grooves 68 and 58, and the exhaust port 28. Since substantially uninhibited fluid communication is permitted through the booster 10, no back pressure is developed in the system except by the charging valve 30 unless the power steering gear 26 is operated. The charging valve 30, as described hereinabove, is adapted to develop pressure in the hydraulic system even if neither the booster 10 nor the power steering gear 26 is operated. The back pressure developed by the charging valve 30 is used to charge the accumulator 38 when the vehicle is first started to thereby provide an immediate auxiliary fluid reserve.

When a brake application is effected, actuation of the brake pedal 12 urges the rod 108 to the left viewing FIG. 2, thereby pivoting the levers 114 about the pivot 112, since the spring 124 is sufficiently strong to normally maintain the bracket 122 into engagement with the abutment means 126. Therefore, pivoting of the lever means 114 urges the spool valve 56 to the left viewing FIG. 1, since the spring 86 is sufficiently strong so that relative movement between the sleeve 84 and the spool valve 56 is normally prevented. When the spool valve 56 is shifted, the orifice defined between the lands 64 and 70 is reduced, thereby restricting flow between the inlet port 20 and the outlet port 24 to develop fluid pressure in the groove 60. At the same time, land 62 laps with land 72 to prevent fluid communication between the grooves 68 and 58, thereby terminating fluid communication from the pressure chamber 48 to the exhaust port 28. Simultaneously, communication is initiated between the grooves 60 and 58, so that the high pressure fluid developed in the groove 60 is communicated into the pressure chamber 48 through the groove 68, the passage means 78, and the port means 80 and 82. High pressure fluid in the pressure chamber 48 acts upon the right end of the piston 50 to urge the latter to the left viewing FIG. 2, thereby effecting a brake actuation. Even if the pressure level in the pressure chamber 48 reaches a relatively high level, the valve member 102 remains sealingly engaged with the valve member 100, since the fluid pressure in the pressure chamber 48 also acts on the end of the valve member 100 to urge the latter to the left viewing FIG. 2 and maintaining the latter sealingly engaged with the valve member 102.

As is well known to those skilled in the art, a malfunction may prevent normal fluid communication into the pressure chamber 48. For example, if the vehicle engine dies, or if the pump 22 fails, or if the pump drive belt breaks, no fluid pressure can be circulated through the hydraulic system. Similarly, if the spool valve 56 sticks, so that it cannot be moved, fluid pressure cannot be communicated into the pressure chamber 48. If such a failure occurs, the operator-applied force collapses the spring 86, moving the retainer 88 into engagement with the end of valve member 102. Further movement of the sleeve 84 relative to the spool valve 56 urges the valve member 102 out of sealing engagement with the valve member 100, to permit high pressure fluid from the accumulator 38 to flow into the pressure chamber 48, where it acts on the right hand end of the piston 50 to effect a brake application in the normal manner. It will be noted that as the sleeve 84 moves relative to spool valve 56, the sleeve 84 covers the outlet port means 80, so that fluid communication between the pressure chamber 48 and the passage means 78 is prevented. This prevents the high pressure fluid in the accumulator communicated into the pressure chamber 48 from being leaked from the pressure chamber, thus preserving the integrity of the system. While the check valve 90 prevents communication from the pressure chamber 48 into the passage means 78, flow from the passage means 78 into the pressure chamber 48 is permitted. Therefore, if the vehicle's engine should be restarted, thus resuming normal operation of the power steering pump, or if a stuck spool valve should free itself to permit normal fluid communication into the pressure chamber 48, the high pressure fluid communicated into the passage means 78 is communicated into the pressure chamber 48 through the port 82, even if the operator does not release the brake pedal, thereby resuming normal operation of the booster. It should be noted that, during a stop where the fluid content of the accumulator 38 is used to operate the booster 10, high pressure fluid in chamber 48 acts on the right hand end of the spool valve 56 while fluid pressure is prevented from communicating to the right hand end of the spool valve 56. Therefore, a hydraulic force is developed urging the spool valve 56 to the left, thereby tending to free a stuck spool.

After a sufficient number of brake applications are effected after a malfunction in the main hydraulic system, the accumulator, of course, will become depleted. When this occurs, the brakes may still be actuated manually, since operation of the pedal 12 in this instance will collapse the spring 124, thereby permitting the end of the rod 108 to engage the end of the blind bore 110, to provide a direct mechanical link between the pedal 12 and the master cylinder 14.

I claim:

1. In a vehicle hydraulic system:

a pump for providing fluid pressure in said system;

a brake booster having an inlet port communicated with the outlet of said pump, an outlet port, a pressure chamber, and first valve means controlling communication between said inlet and outlet ports and said pressure chamber to effect a brake application;

an accumulator communicated to said brake booster; and a charging valve communicated with said pump and with said accumulator, said charging valve permitting flow from said pump through said hydraulic system while diverting a portion of the flow through said system to said accumulator for maintaining a predetermined minimum pressure level in the latter;

said brake booster including second valve means permitting fluid communication from said accumulator into said pressure chamber when a brake application is effected and a malfunction prevents fluid communication into said pressure chamber from said inlet port;

said first valve means being shiftable from a first position permitting substantially uninhibited communication between said inlet and outlet ports and preventing communication between said inlet port and said chamber to a second position restricting flow between the inlet and outlet ports to develop back pressure in said inlet port and communicating said inlet port with said pressure chamber to effect a brake application;

passage means defined within said valve means to communicate said inlet port to said pressure chamber when said first valve means is shifted from said first position; and actuating means slidably carried on said first valve means, said actuating means moving relative to said first valve means when the latter is disposed in said second postion to first terminate communication from said pressure chamber into said passage means and to thereafter actuate said second valve means to communicate said accumulator with said pressure chamber.

2. The invention of claim 1:

said passage means terminating in first and second port means communicating said passage means with said pressure chamber, said actuating means closing said first port means upon movement of said actuating means relative to the first valve means; and check valve means preventing communication through said second port means from said pressure chamber into said passage means, but permitting communication in the reverse direction.

3. The invention of claim 2:

said check valve means including a valve seating area circumscribing said passage means, a retainer, resilient means urging said retainer toward said valve seating area, and a sphere disposed between said retainer and said seating area.

4. In a vehicle hydraulic system:

a pump for providing fluid pressure in said system;

a brake booster having an inlet port communicated with the outlet of said pump, an outlet port, a pressure chamber, and first valve means controlling communication between said inlet and outlet ports and said pressure chamber to effect a brake application;

an accumulator communicated to said brake booster;

means for charging said accumulator with the fluid pressure output of said pump;

second valve means permitting fluid communication from said accumulator into said pressure chamber when a brake application is effected and a malfunction prevents fluid communication into said pressure chamber from said inlet port;

said first valve means being shiftable from a first position permitting substantially uninhibited communication between said inlet and outlet ports and preventing communication between said inlet port and said chamber to a second position restricting flow between the inlet and outlet ports to develop back pressure in said inlet port and communicating said inlet port with said pressure chamber to effect a brake application;

passage means defined within said valve means to communicate said inlet port to said pressure chamber when said first valve means is shifted from said first position;

actuating means slidably carried on said first valve means, said actuating means moving relative to said first valve means when the latter is disposed in said second position to first terminate communication from said pressure chamber into said passage means and to thereafter actuate said second valve means to communicate said accumulator with said pressure chamber;

said passage means terminating in first and second port means communicating said passage means with said pressure chamber, said actuating means closing said first port means upon movement of said actuating means relative to the first valve means; and check valve means preventing communication through said second port means from said pressure chamber into said passage means, but permitting communication in the reverse direction.

5. The invention of claim 4:

said check valve means including a valve seating area circumscribing said passage means, a retainer, resilient means urging said retainer toward said valve seating area, and a sphere disposed between said retainer and said seating area.

* * * * *